United States Patent [19]

Skinner

[11] Patent Number: 5,019,195
[45] Date of Patent: May 28, 1991

[54] METHOD OF ENCAPSULATING A COATED SUBSTRATE

[76] Inventor: George F. Skinner, 4218 Gladstone La., Charlotte, N.C. 28205

[21] Appl. No.: 325,376

[22] Filed: Mar. 17, 1989

[51] Int. Cl.⁵ .................... B32B 31/00; E04F 13/00
[52] U.S. Cl. .................................. 156/71; 156/278; 156/280; 156/305; 52/746; 427/180; 427/196; 427/203; 427/407.1
[58] Field of Search ............... 156/71, 280, 305, 278, 156/312, 279; 427/203, 407.1, 180, 196, 214; 52/746

[56] References Cited

U.S. PATENT DOCUMENTS

| | | | |
|---|---|---|---|
| 2,073,334 | 3/1937 | Coffman | 427/203 |
| 3,044,919 | 7/1962 | Stoneburner | 156/71 |
| 3,190,780 | 6/1965 | McNulty et al. | 156/278 |
| 3,220,731 | 11/1965 | Germino et al. | 427/415 |
| 3,770,536 | 11/1973 | Haigh | 156/71 |
| 3,888,714 | 6/1975 | Fiser et al. | 427/203 |
| 3,993,822 | 11/1976 | Knauf et al. | 156/71 |
| 4,007,075 | 2/1977 | McClain et al. | 427/203 |
| 4,073,997 | 2/1978 | Richards et al. | 156/71 |
| 4,380,595 | 4/1983 | Arpin | 427/221 |
| 4,778,544 | 10/1988 | Jones et al. | 156/71 |

Primary Examiner—Wilbur Bascome
Attorney, Agent, or Firm—James B. Hinson

[57] ABSTRACT

A layer or coating bonded to a substrate is encapsulated to prevent portions of the layer from becoming detached and randomly distributed. This is accomplished by applying a first layer of an adhesive to the exposed surface of the layer to be encapsulated. A second layer composed of a fibrous material is placed in contact with the first layer of adhesive and then an additional layer of adhesive is applied by a suitable technique such as brushing or coating. The additional layer of adhesive penetrates the fibrous material forming a stratified layer composed of an outer layer primarily of the adhesive, an intermediate layer composed primarily of a mixture of adhesive and fibrous material and an inner layer including the exposed surface layer and portions of the adhesive. The method is useful for encapsulating potentially hazardous materials such as lead based paints and asbestos.

10 Claims, 3 Drawing Sheets

METHOD OF ENCAPSULATING A COATED SUBSTRATE

BACKGROUND OF THE INVENTION

The invention relates to coatings and more specifically to multilayer coatings useful in encapsulating potentially hazardous materials such as lead based paints and asbestos.

DESCRIPTION OF THE PRIOR ART

In recent years there has been increased emphasis on isolating hazardous and potentially hazardous materials from the environment. Such hazardous materials are found in a variety of situations, each requiring specific techniques to reduce the dangers of such material. Of particular interest has been requirement to protect people from lead poisoning due to lead based paints which were widely used in prior years. Recently, an increased emphasis has been placed on methods and techniques for encapsulating materials such as lead based paint, to permit the continued use of objects coated with these materials, without undue hazards.

A prior art search was performed before preparing this patent application. During the search the following patents were noted as of interest. These patents are listed in descending numerical order.

U.S. Pat. No. 4,713,263, discloses ethylene vinyl acetate composition and the use of such materials in coating applications.

U.S. Pat. No. 4,543,366, illustrates sprayable urethane coating which can include re-enforcing materials such as chopped fiber glass.

U.S. Pat. No. 4,263,373, illustrates a decorative laminate including an outer abrasion resistant protective coating.

U.S. Pat. No. 4,158,713, illustrates a bonded sheet material for use in covering the surface of materials such as composition board.

U.S. Pat. No. 4,048,001, illustrates a polyurethene adhesive for use in textile applications.

U.S. Pat. No. 3,993,827, illustrates laminated constructions which include glass cloth layers.

U.S. Pat. No. 3,620,890, illustrates a method of forming multilayer floor and wall covering which includes a resilient backing bonded to a fibrous material.

U.S. Pat. No. 3,052,019, discloses an insulating material covered with a fiber glass pad. (See FIG. 3.)

U.S. Pat. No. 3,044,919, discloses a method for applying materials to a wall surface.

U.S. Pat. No. 2,448,357, illustrates the use of a durable outer facing or finish adhesively applied to exterior articles such as walls and structures.

U.S. Pat. No. 2,445,777, illustrates hard surfaces useful for floors.

U.S. Pat. No. 714,960, illustrates a process for coating substances to render them harmless.

SUMMARY OF THE INVENTION

The disclosed invention provides a method and techniques for coating objects with a hard, tough multilayer coating suitable for applications such as encapsulation of lead based paint or other potentially hazardous materials. More specifically, the invention provides a method for applying a tough, chip-resistant coating (which may be multi-layer) cooperating with potentially hazardous coatings to render such coatings substantially non-hazardous when the objects are utilized in a normal manner.

In practicing the preferred embodiments of the invention, a first layer of suitable adhesive is applied to the exposed surface of the layer to be encapsulated. A second layer of matted material, for example material known in the fiberglass industry as "vail," is placed in contact with the first layer of adhesive and a second layer of adhesive is applied by a suitable technique such as brushing and coating. The second layer of adhesive penetrates through the "vail" and joins with the first layer of adhesive to form a multi-layer coating. Since the adhesive is soft, the exact boundaries of each layer may be obscured. That is to say, the first and third layers are predominantly adhesive with the intervening layer consisting of a mixture of fiber and adhesive. If lead based paint is to be encapsulated, the adhesive may (as subsequently described) penetrate the painted or hazardous surface and could even bond directly to the subltrate. Such penetration creates an inner layer consisting of a composite of paint and adhesive. The characteristics of the multilayer coating prevents lead based paint from powdering, chipping into small pieces and other breaking which can result in the lead contained in such paint being uncontrollably distributed into the environment.

Surfaces coated with lead based paint treated in accordance with the present invention have been inspected by appropriate public safety officials, such as HUD officials, and approved for encapsulating such materials for environmental protection reasons.

Definitions

Substrate as used in this patent application refers to any object or structure covered with a layer to be encapsulated.

Encapsulation as used in this patent application is a generic term defining a process in which a first layer overlying an object (substrate) is covered by an additional layer or layers to entrap the first layer between the object and the overlying layer or layers.

DETAILED DESCRIPTION

The invention was specifically developed to provide a process and materials for encapsulating substrates painted with lead based paints. Damage frequently occurs from lead based paint in homes when children ingest paint particles which have become detached from painted surfaces. Other types of lead contamination from such sources is also possible.

The present invention provides materials and a method for encapsulating lead based paints between the substrate and a layer having characteristics which prevents paint particles containing lead from becoming detached from the painted surface.

Additionally, the coating produced by the process may be used on interior surfaces, exterior surfaces and in conjunction with all substrate materials to which lead based paint will adhere. Alternatively, the coating process and materials may have application other than encapsulating of lead based paint due to its mechanical properties and moisture resistant characteristics.

Figure 1:
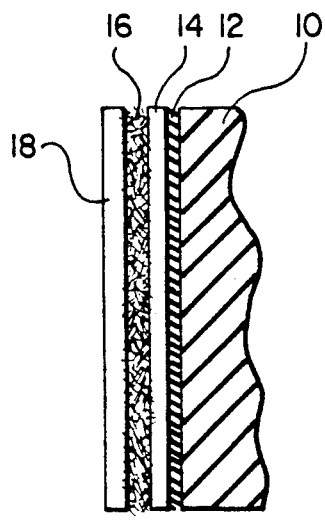
FIG. 1 is a cross sectional drawing illustrating the application of a coating in accordance with the invention to a typical wall.

FIG. 1 is a cross sectional drawing illustrating the process comprising the preferred embodiment of the invention. More specifically this drawing illustrates the application of a coating bonded to a substrate 10 to encapsulate a potentially hazardous layer 12, such as lead based paint.

In applying the coating, a first layer of adhesive 14 is applied over the lead based paint 12. After the first adhesive layer 14 is applied, a fibrous mass known in the fiberglass industry as "vail" 16 is applied over the first layer of adhesive 12. The "vail" 16 is then coated with an (outer) third layer 18 of adhesive. The outer layer of adhesive 18 penetrates through the "vail" 16 joining with the inner layer 14 of the adhesive. In other applications, the coating may be applied directly to the substrate 10.

In the case of lead based paint layers, adhesives are currently known and subsequently described which penetrate several layers of old paint and bond directly to substrate 10. Usable adhesives include acrylics, epoxy, polyesters, vinylesters, cements, glue, adhesives and similar substances. "Vail" is also commercially available.

The process illustrated in FIG. 1 is applicable to almost any type of surface. This is true because the inner layer of adhesive is applied as a liquid and conforms to the surface contour of the substrate 10. Additionally, adhesives adhering to a wide variety of surfaces and hardening to produce a suitable tough chip-resistant surface are included in the above list of suitable adhesives but not limited to the above list. The "vail" 16 is also sufficiently flexible to conform to the surface contour of the substrate 10 without forming undesirable discontinuities such as wrinkles or lumps. Both layers of adhesives may be easily applied by spraying, brushing, or rolling, thus further increasing the flexibility and ease of use. Of the above described adhesives, acrylics, epoxy, polyester, and vinylester are of particular interest in that they have the capability of penetrating lead based paints and bonding directly to the underlying substrate. Coatings providing these and the other advantages discussed herein are not currently available.

Figure 2:
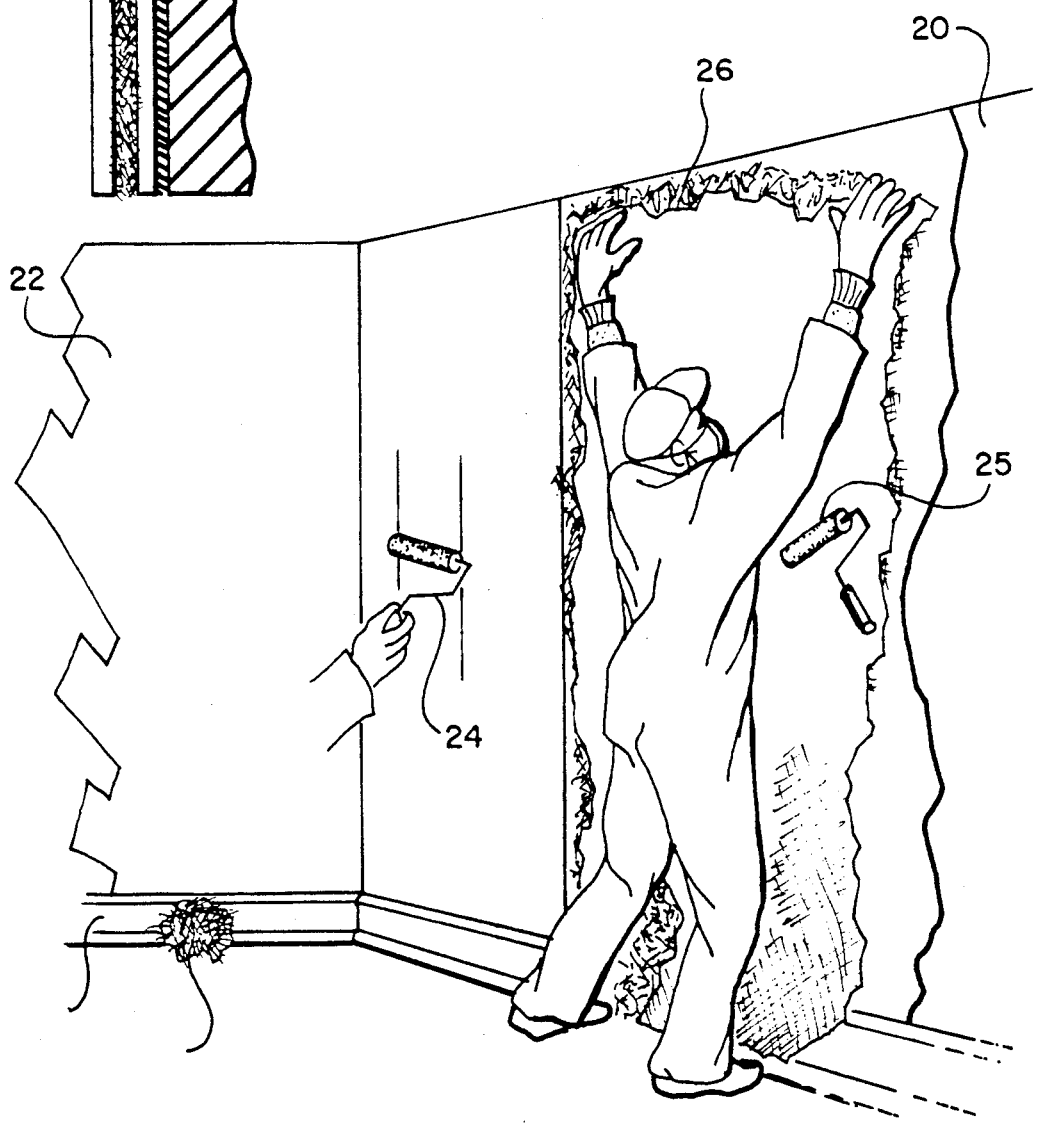
FIG. 2 is a partial asymmetric drawing illustrating the application of a coating in accordance with the invention to a typical wall such as the interior of a room.

FIG. 2 further illustrates the basic process of applying the coating to a typical wall of a room with the wall functionally illustrated at reference numeral 20. A first layer of adhesive 22 is applied to the interior surface of the wall with the layer being applied by rolling as illustrated at reference numeral 24. After the inner layer 22 of adhesive is applied, a fiber glass "vail" 26 is placed against the adhesive coated wall as illustrated at reference numeral 26. The "vail" is of sufficient dimensions to extend beyond the limits of the portions of the wall to be coated. After the "vail" has been placed against the first layer of adhesive, the outer layer of adhesive is applied also using rollers, brushes, spraying or similar techniques. In FIG. 2 the outer layer is illustrated as being applied with a roller at reference numeral 25. Portions of the "vail" 26 extending beyond the adhesive coated regions of the wall are removed by a breaking, after the adhesive has been hardened.

Additionally, the coating can be applied to trim such as base board 28, using essentially identical technique. To illustrate this, a portion of the "vail" not yet positioned against the base board is illustrated at reference numeral 30.

Figure 3:
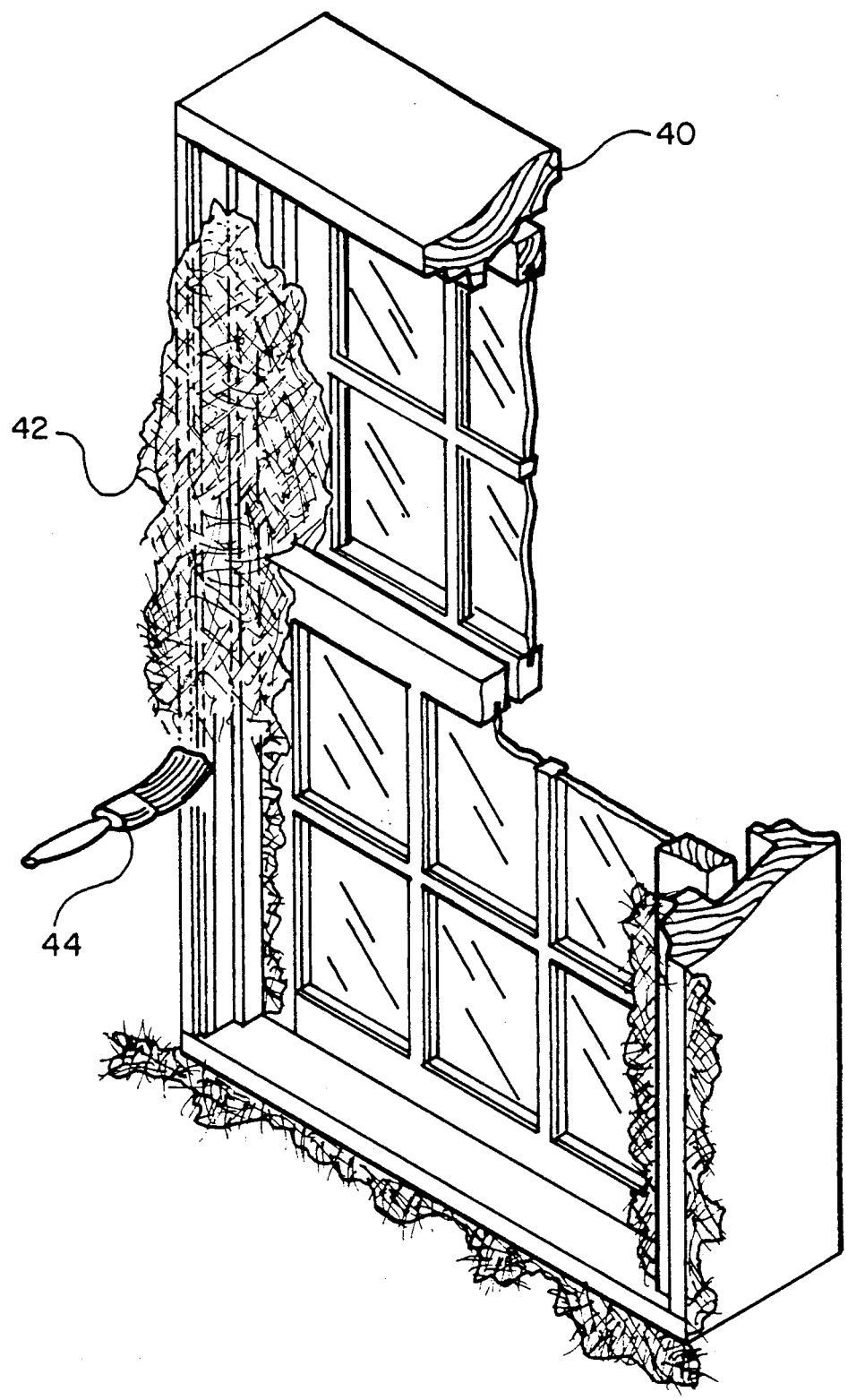
FIG. 3 is a drawing illustrating the application of a coating in accordance with the invention to exterior trim surfaces such as a conventional window.

FIG. 3 illustrates the application of the coating comprising the invention to a typical residential window frame 40. More specifically, the surfaces of the window frame 40 not to be covered are masked off with masking tape. The first layer of adhesive is applied to the unprotected portions of the window frame 40 using a brush or similar techniques. A "vail" of fibrous material 42 is then applied over the first adhesive layer and the second layer of adhesive is applied. The second layer of adhesive may be applied using a brush as illustrated at reference numeral 44. After the adhesive has hardened, portions of the "vail" extending beyond the adhesive are broken away to form a protective layer covering the unprotected portions of the window frame 40.

Figure 4:
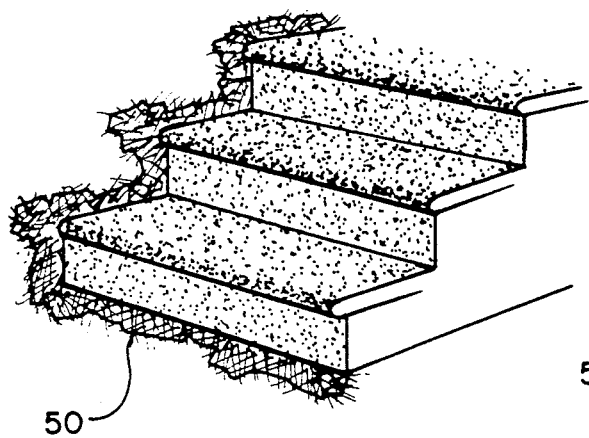
FIG. 4 is a drawing illustrating application of a layer in accordance with the invention to a stairway.

Coatings applied in accordance with the invention are also sufficiently rugged to permit the process to be used to cover potentially hazardous layers such as lead based paint on stairways and other objects which are subjected to abrasive forces during normal use. Such an application is illustrated in FIG. 4.

In such applications, the first layer of adhesive is applied to the stairway and the entire surface is covered with a suitable "vail" 50, a second layer of adhesive applied over the "Vail". This entire process is illustrated in FIG. 4. Once the adhesive has hardened, excessive portions of the "vail" are removed by breaking or other suitable techniques. This is the same process previously described as applied to other structures.

Figure 5:
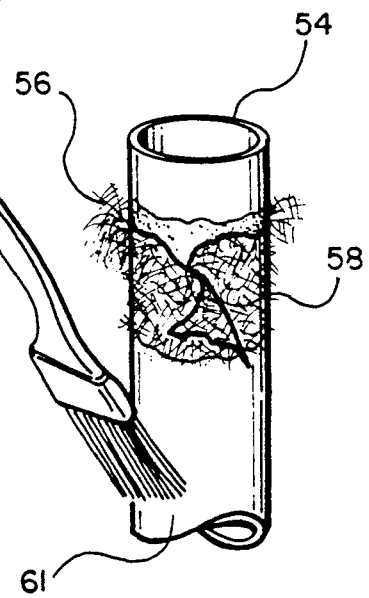
FIG. 5 is a drawing illustrating the application of a layer in accordance with the invention to a cylindrical member such as a round post.

FIG. 5 illustrates the process as applied to covering a cylindrical object such as a round post 54. In this application a first layer of adhesive 56 is applied to the cylindrical posts 54. A layer of "vail" 58 is then applied to the first layer of adhesive with a second layer of adhesive applied to the fiber glass matt by brushing as illustrated at reference numeral 61. After the adhesive has hardened, excess portions of the "vail" are removed by breaking.

Figure 6:
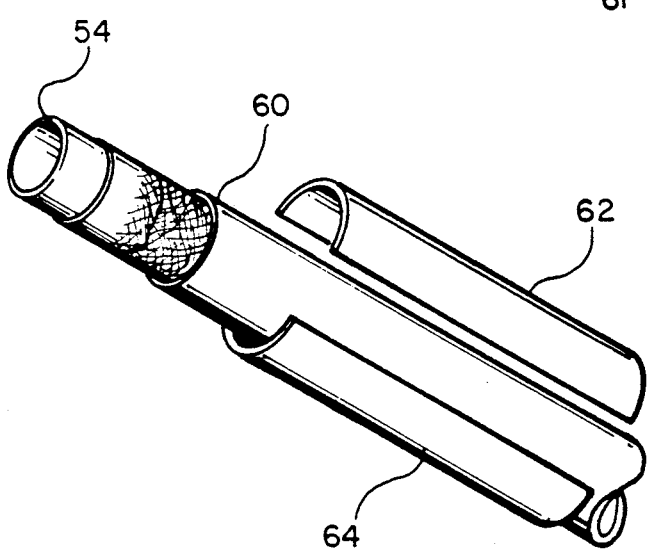
FIG. 6 is a drawing illustrating an alternate embodiment of the invention which provides an additional protection exterior layer such as PVC.

FIG. 6 illustrates a modification of the basic process in which further protection is provided for the multi-layer coating 60 which is applied as previously described. Overlying this layer is a second protective layer which may be PVC.

A suitable technique for producing the second protective layer is to select PVC tubing of the proper interior dimensions and cut it into two halves horizontally. Prior to hardening of the adhesive 60, the two halves, 62 and 64, are placed around the cylindrical members 54 and held in place by any suitable means until the adhesive has dried. Sufficient adhesive is applied to fill any void which may exist along the joining edges of the PVC. After the adhesive has hardened, excess adhesive is removed by sanding and the entire surface painted or otherwise finished as desired. In this application the multi-layer coating serves as an adhesive. Other adhesives may be used to bond the PVC to the pipe 54.

Many modifications of the invention are possible. For example, in some applications, it is possible to chop the fibers in short sections, mix the chopped fibers with the adhesive and apply the coating in a one step process. Cloth, mesh, fiber and other reinforcing materials may be used instead of or in combination with "vail". Other hazardous materials including arsenic, plasters, toxic metals and other toxic materials may be encapsulated using the disclosed process.

I claim:

1. A method for encapsulating a layer bonded to a substrate to prevent portions of said layer from becoming detached and randomly distributed, comprising the steps of:
    a) covering said layer with an adhesive material capable of penetrating said layer and bonding to said substrate;
    b) combining a fibrous material with said adhesive; and
    c) applying a second layer of adhesive, such that said adhesive penetrates said fibrous material to form a stratified layer, said stratified layer comprising an outer layer, an intermediate layer and an inner layer, said outer layer consisting primarily of said adhesive, said intermediate layer consisting primarily of a mixture of said adhesive and said fibrous material, said inner layer including materials comprising said layer and portions of said adhesive.

2. A method for encapsulating a layer in accordance with claim 1 wherein said layer is bonded to a curved surface and further including the step of affixing an additional layer of flexible material to said layer.

3. A method for encapsulating a layer in accordance with claim 2 wherein said flexible material is plastic.

4. A method for encapsulating a layer in accordance with claim 3 wherein said plastic is polyvinyl chloride.

5. A method for encapsulating a layer in accordance with claim 4 wherein said additional layer is formed by slitting a polyvinyl chloride pipe longitudinally.

6. A method for encapsulating a layer in accordance with claim 5 wherein said layer includes biologically hazardous substances.

7. A method for encapsulating a layer in accordance with claim 6 wherein said layer is paint.

8. A method for encapsulating a layer in accordance with claim 7 wherein said paint includes metallic substances which are hazardous.

9. A method for encapsulating a layer in accordance with claim 8 wherein said metallic substances include lead.

10. A method for encapsulating a layer in accordance with claim 9 wherein said fibrous material is fiberglass.

* * * * *